Nov. 23, 1948.  N. P. STOATE  2,454,411
INSPECTION APPARATUS FOR TRANSPARENT VESSELS
Filed Sept. 14, 1945  2 Sheets-Sheet 1

Inventor
NORMAN PARKER STOATE
by
Attorney

Nov. 23, 1948.  N. P. STOATE  2,454,411
INSPECTION APPARATUS FOR TRANSPARENT VESSELS
Filed Sept. 14, 1945  2 Sheets-Sheet 2
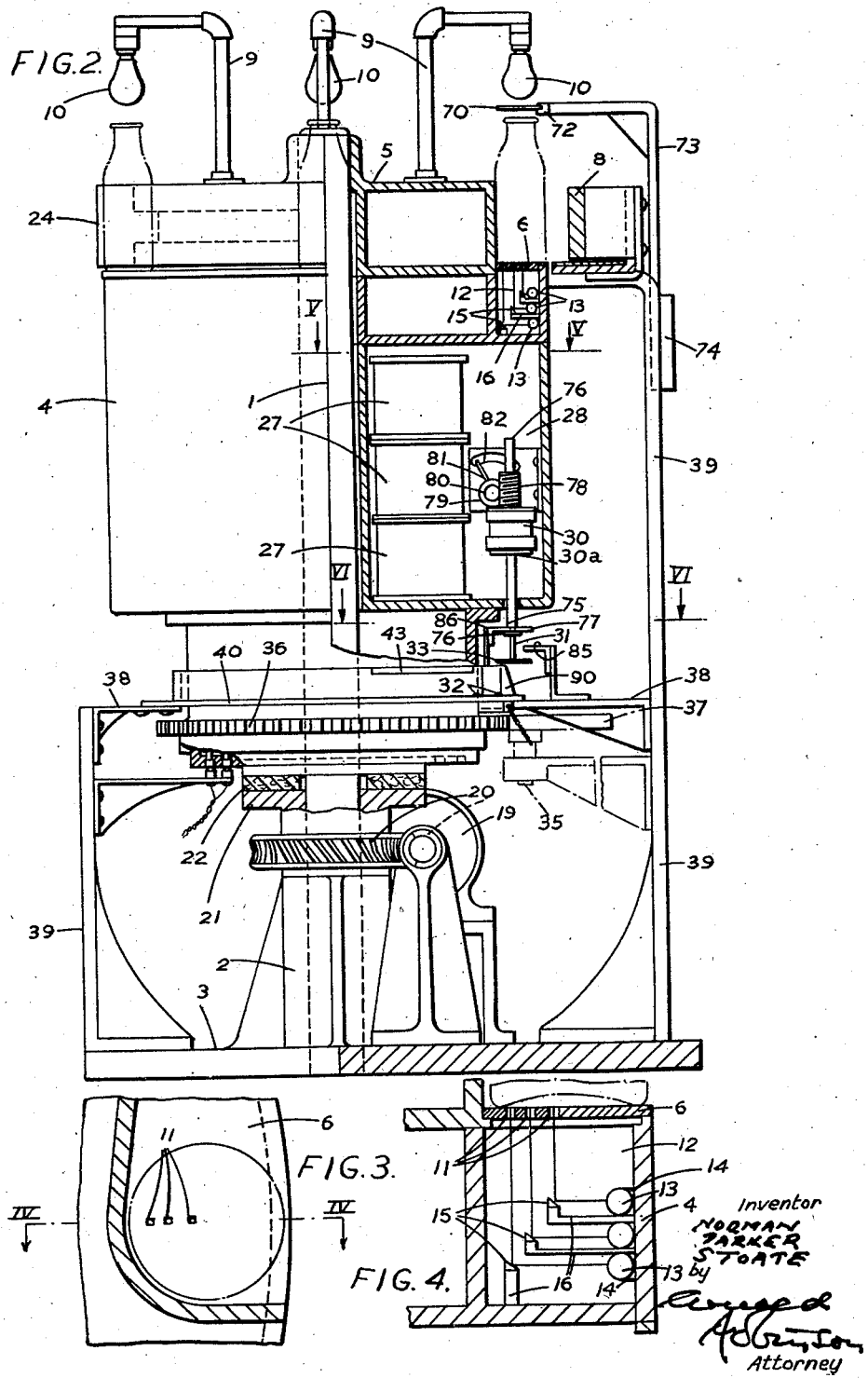

Patented Nov. 23, 1948

2,454,411

UNITED STATES PATENT OFFICE 2,454,411

INSPECTION APPARATUS FOR TRANSPARENT VESSELS

Norman Parker Stoate, Hampstead Garden Suburb, London, England, assignor to United Dairies Limited, London, England, a British company Application September 14, 1945, Serial No. 616,300
In Great Britain September 19, 1944

13 Claims. (Cl. 250—41.5)

This invention relates to apparatus for scanning the bottom of a transparent vessel to detect foreign particles therein, by means of light directed longitudinally through the mouth and bottom of the vessel on to a photo-electric device.

The bottoms of such vessels, for example milk bottles, are usually convex internally with the result that smaller particles tend to collect at the periphery of the bottom of the vessel adjacent the wall thereof. Larger particles however may be found anywhere on the bottom of the vessel as such particles are liable to adhere to the surface of the bottom.

A main object of the invention is to provide a form of apparatus for detecting foreign particles on the bottom of a transparent vessel in which the sensitivity of the apparatus is greater when scanning areas of the vessel bottom in which the smaller particles tend to collect than when scanning other areas thereof.

To this end according to the present invention apparatus for scanning the bottom of a transparent vessel to detect foreign bodies thereon by means of light directed longitudinally through the mouth and bottom of the vessel on to a photo-electric device includes in combination, means for rotating the vessel about is longitudinal axis relatively to a screen disposed between a source of light and the photo-electric device, said screen having a number of apertures disposed in a line substantially radial of the bottom of the vessel when the latter is in scanning position, said apertures being spaced closer together in regions in which detection of smaller particles is required than in regions in which detection of larger particles is required, and said apertures having an area relatively small compared with that of the bottom of the vessel.

The spacing between consecutive apertures is not greater than the overall dimensions of the smallest particle to be detected in the region containing said apertures less the dimension of the aperture along the radius. By so arranging the apertures a particle of predetermined minimum size in any region must obscure a part at least of one aperture.

As already mentioned, the bottoms of most vessels are convex internally in which case the smaller particles tend to collect at the periphery of the bottom of the vessel and for scanning such vessels the apparatus will be constructed with the apertures spaced closer together towards the periphery of the screen than towards the center thereof.

In the case of vessels of which the bottom is convex internally the convexity of the bottom results in a reduction in the intensity of the light passing through the bottom at the periphery as compared with that of the light passing through the centre and a further object of the invention is to provide a construction which will compensate for this difference in the intensity of the light reaching the photo-electric device through the bottom of the vessel.

To this end, according to a further feature of the invention, in construction in which a single photo-electric device is used for each screen the apertures increase in area from the centre to the periphery of the bottom of the vessel so that more light is passed by the outer apertures than by those nearer to the centre. Conversely if the apparatus is to handle vessels of which the bottom is concave internally the apertures will decrease in area from the centre to the periphery.

Alternatively, the apertures may all be made the same size, and a separate photo-electric device associated with each aperture, the sensitivity of each photo-electric device being adjusted in accordance with the intensity of the light passing through its associated aperture.

Accordingly the invention includes constructions in which the apertures vary in area from the centre towards the periphery of the bottom of the vessel in accordance with the variation in the intensity of the light from the centre to the periphery of the bottom of the vessel due to the curvature of said bottom.

Preferably the apertures are formed in a support for the vessel, which support then constitutes the screen, and such support may be constituted by a platform in a recess in a rotating head, the recess serving to locate the vessel on the platform. The head may be provided with a number of such platforms and recesses and may rotate relatively to a stationary yielding belt with which the vessels engage as the head rotates whereby the vessels are rotated on the platforms.

The photo-electric device is preferably in the form of a photo-electric cell arranged to control an electric circuit in such a way that if the intensity of the light falling on the cell is reduced below a predetermined value the change in the current flowing in the circuit operates a device to give an indication of the presence of the foreign body in the vessel.

In some cases vessels which are intended to be of clear transparent material have become slightly tinted in the process of manufacture, and if a mixed batch of clear and tinted vessels is being inspected the sensitivity of the apparatus may have to be adjusted relatively coarsely to avoid a tinted vessel operating the cell.

If necessary this coarse adjustment may be obviated by employing the arrangement already referred to, of a separate photocell for each aperture or group of apertures, so that each cell may be individually adjusted to a sensitivity suitable to the intensity of light passing through it.

In order that the invention may be more completely understood two embodiments thereof will now be described by way example with reference to the accompanying drawings in which—

Fig. 2 is an elevation partly in section.

Fig. 3 shows the arrangement of the scanning apertures to a larger scale.

Fig. 4 is a section on the line IV—IV of Fig. 3.

Figure 1:
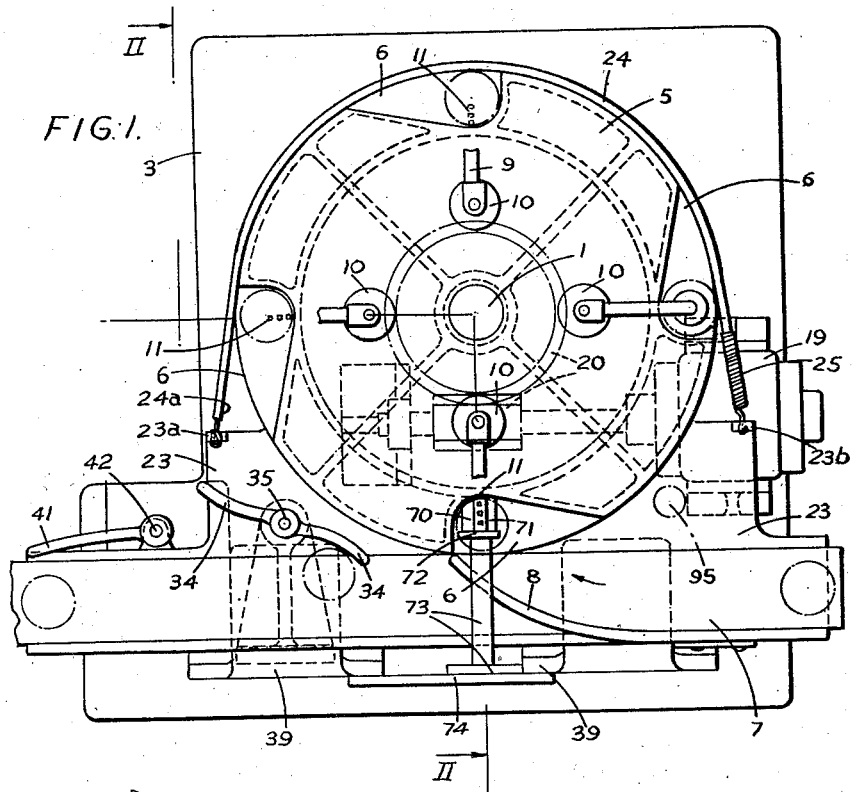
Fig. 1 shows in plan one form of apparatus having a plurality of apertures in each screen, and each aperture having an individual photocell.
Figure 5:
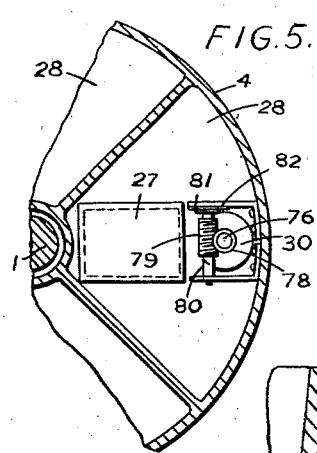
Fig. 5 is a section on the line V—V of Fig. 2.

In the construction illustrated in Figs. 1 to 6 of the drawings the apparatus comprises a vertical central shaft 1 fixed in a support 2 carried by a base plate 3.

Rotatably mounted on the shaft 1 is a casing 4 on the upper part of which is carried a head 5 comprising four platforms 6 to receive the bottles.

The bottles are fed to the rotating head 5 by a conveyor band 7 which may be driven by any known means, a guide 8 being provided to feed the bottles on to the platform 6; the head being recessed at each platform as shown to locate a bottle on the platform.

Depending from a support 9 carried by the head 5 adjacent each platform 6 is a lamp 10 which is disposed immediately above the centre of the respective platform 6 and at a height above it sufficient to permit the insertion of a bottle on the platform below the lamp, so that the light from the lamp passes longitudinally through the mouth and bottom of the bottle on the platform.

Formed in each platform is a series of three scanning apertures 11 (Figs. 1, 3 and 4) all of equal area and disposed on a line such that when a bottle is in the scanning position on the platform, the line of apertures 11 is substantially radial of the bottom of the bottle and includes an aperture at or near the centre of the platform, while in accordance with the invention, the spacing between adjacent apertures 11 diminishes from the centre towards the periphery. (Fig. 3.) The area of the apertures is small in relation to that of the bottom of the bottle.

Formed within the head 5 below each platform is a compartment 12 within which are mounted three photocells 13, one for each of the three apertures.

Each photocell 13 is fixed to the inside of the wall of the casing 4 as shown diagrammatically at 14 in Fig. 4 and the light passing through the respective aperture 11 is transmitted to the photocell by a prism 15 carried on a support 16 likewise fixed to the inside of the casing 4. The lamps 10 may be shaded to prevent light from one lamp affecting the cells associated with another.

The casing 4 is rotated by an electric motor 19 which, through a worm gear 20 drives a clutch element 21 freely mounted on the shaft 1. The casing 4 rests freely on a friction disc 22 disposed between the bottom of the casing 4 and the clutch element 21, the weight of the casing being sufficient to provide an effective friction grip and consequent driving of the casing from the motor.

Connected at one end to a lug 23a on a fixed frame member 23 is a belt 24 of flexible inextensible material, e. g. canvas, the inside of which has a lining 24a of friction material such as rubber. The other end of said belt is connected by a spring 25 to another fixed lug 23b so that the belt embraces the head 5.

As the casing rotates, and carries the bottles around, the external wall of each bottle engages the lining 24a of the belt 24 whereby the bottles are rotated about their longitudinal axes on the platforms 6 as they travel around bodily with the head 5.

Each photocell 13 is arranged to control an electric circuit in such a way that if the intensity of the light falling on the cell is reduced below a predetermined value the resulting change in the current flowing in the circuit operates a device to give an indication of the presence of a foreign body in the bottle.

To this end each photocell is connected to an amplifier housed within a casing 27 carried within a compartment 28 formed in the casing 4 and the output of each amplifier is connected to a relay, also housed within the casing 27, the three relays associated with the group of three cells 13 associated with one platform 6 serving to control a current supply to one magnet 30 of which the armature 30a controls the circuit for operating the indicating apparatus.

The magnet 30 is normally energised and is de-energised when the light falling on any one of the three photocells is reduced due to a foreign body. When the magnet thus becomes de-energised the trip rod 31 drops and connects a pair of contacts 32 by means of a disc 33 carried by the trip rod 31.

As already mentioned the head 5 rotates about the shaft 1 and during this rotation the bottles rotate about their axes whereby the bottom of each bottle is scanned by the apertures 11.

If during this scanning operation a foreign body is present in a bottle this body on passing over one of the apertures 11 will reduce or block off the light falling on the associated photocell 13 and the current flowing through the respective amplifier will be increased. This increased current opens the contacts of the associated relay whereby the circuit to the magnet 30 is interrupted and the latter becomes de-energised thereby permitting its trip rod 31 to fall.

This fall of the trip rod 31 is utilised to eject the defective bottle and the means for effecting this operation will now be described.

The bottles are discharged from the platforms 6 on to the conveyor band by means of rotating fingers 34 which act alternately, being secured to a shaft 35 which is driven at a speed relative to that of the casing 4 such that the bottle when impelled by one of the fingers 34 travels faster than when impelled by the head 5. This shaft 35 is rotated by means of gear teeth 36 cut on the lower part of the casing 4, which teeth engage with a gear wheel 37 secured to the shaft 35 (see Fig. 2).

Mounted on brackets 38 secured to standards 39 rising from the base plate 3 is a fixed ring 40 carrying a pair of insulated contacts 32 connected to apparatus for releasing a guide 41 for ejecting the defective bottle from the band 7 after said bottle has been discharged from the head 5 on to said band.

This guide 41 is secured to a shaft 42 and is normally latched out of the path of the bottles as they pass along on the band 7, a magnet for releasing the latch being energised when the contacts 32 are bridged by the disc 33 of the trip rod 31. When the latch is released a spring pulls the guide 41 into the path of the bottles so that the defective bottle is guided off the band 7 on to a receiving platform.

It will be understood that a bottle in which no foreign body has been detected will, in passing off the platform 6, tend to release the trip rod 31, since the walls of the bottle in passing over the apertures 11 will reduce the light reaching the photocells 13.

In order to obviate this incorrect release of the trip rod 31, a guard plate 43 is provided above the ring 40, this plate 43 being disposed so that its upper surface is just level with the under-surface of the disc 33 on the trip rod 31 when the latter is in its raised position. When the magnet 30 is de-energised due to the bottle walls passing over the apertures 11, the trip rod 31 is prevented from dropping by the guard plate 43.

If, however, the magnet 30 has already been de-energised due to a foreign body in the bottle passing over one of the apertures 11, the trip rod 31 will have dropped until arrested by its disc 33 engaging the ring 40. The disc 33 will therefore pass round under the guard plate 43 and will bridge the contacts 32, thereby releasing the ejector finger or guide 41.

The contacts 32 must be placed so as to give the necessary delay in the release of the guide 41, which release must occur after the preceding bottle has passed the position which the guide 41 occupies when released, but before the bottle to be ejected has reached a position in which it would be struck by the guide during the movement of the latter.

Figure 6:
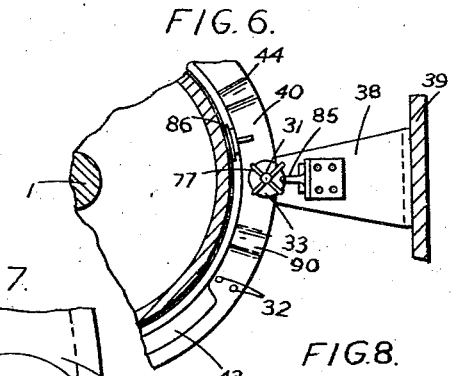
Fig. 6 is a section on the line VI—VI of Fig. 2.

In order to reset the trip rod 31 into its upper position after it has been released, a ramp 44 is provided on the ring (Fig. 6). Conveniently this ramp is placed so as to be engaged by the disc 33 on the trip rod just after a bottle has arrived on the associated platform 6. By this means the trip 31 is reset after having been released either by a foreign body in the bottle which was previously on the platform 6, or by the passage of the walls of the next following bottle over the apertures 11 while said following bottle was passing on to the platform 6.

In apparatus according to the present invention it is preferable to provide means for compensating for fluctuations in the supply voltage. To this end there may be provided two translucent screens 70 and 71 one darker than the other disposed between the lamp 10 and the platform 6 at a height above the platform sufficient to permit the insertion of a bottle below the screens. These screens are mounted in a holder 72 carried by a support 73 attached to a plate 74 connected across the standards 39. The lighter screen 70 is in advance of the darker screen 71 so that each platform 6 of the rotating head 5 passes the lighter screen first and then the darker screen.

The lighter screen 70 has a light transmission value, assuming the voltage to be normal, which is equal to that of the scanning device, i. e., of the three holes 11 when a clean bottle is passing over said holes so that when a platform 6 without a bottle passes under it the lighter screen 70 will not effect operation of the photocell relay; whereas the darker screen 71 has a light transmission value which, assuming the voltage to be normal, is equal to that of the scanning device when one of the apertures 11 is covered.

Mounted about the trip rod 31 of the magnet 30 is a sleeve 75 held against axial movement relatively to the trip rod by means of collars 76 secured to said rod, the magnet armature 30a being secured to this sleeve. On its lower end the sleeve 75 carries a spider having four arms 77 and at its upper end the sleeve carries splined thereto a worm 78 meshing with a worm wheel 79 secured to a spindle 80 carrying the moving contact arm 81 of a rheostat 82 controlling the supply voltage to the lamps 10. Disposed on a fixed part of the frame are a lower and an upper fixed stud 85 and 86 respectively arranged one on either side of the path of the centre of the sleeve 75 so that if the spider is in its lower position one of its arms 77 will engage the lower stud 85 whereby the spider and its sleeve 75 will be turned in one direction, whereas, if the spider is in its upper position one of its arms 77 will engage the upper stud 86 whereby the spider and sleeve 75 will be turned in the opposite direction.

The studs 85 and 86 are so arranged that when a spider arm 77 engages the lower stud 85 the spindle 80 is turned in a direction to operate the rheostat 82 to increase the voltage whereas engagement of a spider arm 77 with the upper stud 86 will effect rotation of the spindle so to reduce the voltage. Further the lower stud 85 is placed between the lighter screen 70 and the darker screen 71 while the upper stud 86 is placed beyond the darker screen 71.

If the supply voltage is too low the reduction in light reaching the cells 13 caused by the lighter screen 70 will effect de-energisation of the magnet 30, and the spider 77 will drop into the path of the lower stud 85 and will be engaged thereby and the voltage will be increased.

If the supply voltage is too high the reduction in light reaching the cells 13 caused by the darker screen 71 will be insufficient to effect de-energisation of the magnet 30, and the spider 77 will remain held in the upper path and will be engaged by the upper stud 86 and the voltage thereby decreased.

If the supply voltage is at its correct value the reduction in light reaching the cells 13 as the platform 6 passes under the light screen 70 will be insufficient to effect de-energisation of the magnet 30 and the spider 77 will not engage the lower stud 85. When the platform 6 passes under the darker screen 71 the reduction in light will effect de-energisation of the magnet 30 and the spider 77 will therefore drop into the lower path and will not engage the upper stud 86. As neither stud is engaged the spider will not be moved and the voltage will not be changed.

Preferably an additional re-setting ramp 90 is provided to reset to the upper position any spider 77 which may be in the lower path (after having descended owing to the detection of a particle) before the platform reaches the first screen 70.

If desired the lighter screen 70 may be omitted with the result that over sensitiveness will reject all bottles thereby indicating to the operator that the voltage is too low, whereupon he adjusts it by hand.

In some cases it has been found that mere restoration of normal illumination after a particle has passed over the apertures is insufficient to reduce the current in the photocell circuit sufficiently to open the relay with the result that the magnet 30 controlling the trip rod 31 remains de-energised and the trip rod becomes released again immediately after it has been reset. In order to overcome this difficulty means may be provided for increasing the illumination of the bottle while the trip rod is in the neighbourhood of the resetting device.

Such means for increasing the illumination may comprise a supplemental lamp indicated diagrammatically at 95 (Fig. 1) and supported on a fixed standard (not shown) adjacent the rotating head 5 and positioned to direct its light on to the platforms 6 as they pass. This lamp is also positioned between the contacts 32 which are closed by the disc 33 to initiate actuation of the bottle ejecting mechanism and the ramp 44 for resetting the trip rod 31.

After the platform 5 has passed beyond the region illuminated by the supplemental lamp 95 the disc 31 engages the ramp 44, and, since the magnet 30 has become re-energised by the effect on the photocells of the increased illumination from lamp 95, the rod 31 is raised and held in its uppermost position.

Figure 7:
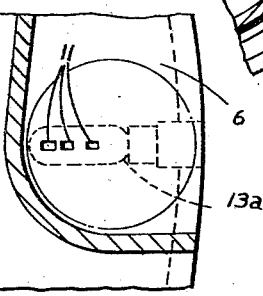
Fig. 7 shows a modification in which there is a cell common to all the apertures in a single screen.

Fig. 7 illustrates diagrammatically an arrangement of apertures for use with a common photocell 13a. In this construction three apertures 11a are formed in the screen 6, these apertures, as before, being disposed on a radius, and the spacing between adjacent apertures diminishing from the centre towards the periphery. In addition however, the apertures increase in size from the centre to the periphery in accordance with the reduction in intensity of the light due to the convexity of the bottom of the bottle.

Figure 8:
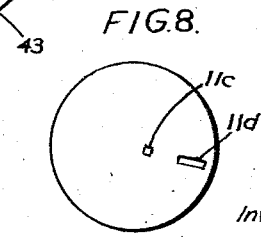
Fig. 8 illustrates a further modification.

A screen having a relatively small aperture 11c at or near the centre, and a slot 11d adjacent the periphery, as shown in dotted lines in Fig. 8 may be used.

Further the source of light may be positioned above the vessel and the photo-electric device below the vessel as shown in the drawings or vice versa.

I claim:

1. Apparatus for scanning the bottom of a transparent vessel to detect foreign bodies thereon, comprising in combination a photo-electric device, a source of light so disposed as to direct light longitudinally through the mouth and bottom of a vessel in scanning position and towards said photo-electric device, a screen disposed between the source of light and the photo-electric device, said screen having a number of apertures disposed to be at different radial distances from the centre of the bottom of a vessel in scanning position, the apertures having an area small in relation to that of a vessel bottom and being spaced apart from each other in a radial direction by distances such that, irrespective of its position on a vessel bottom, a foreign body of predetermined minimum size in a vessel will obscure a part at least of an aperture, and thereby reduce the intensity of the light falling on the photo-electric device below a predetermined value, means for locating a vessel in scanning position between the source of light and the photo-electric device, and means for rotating a vessel about its longitudinal axis relatively to said screen.

2. Apparatus for scanning the bottom of a transparent vessel to detect foreign bodies thereon, comprising in combination a photo-electric device, a source of light so disposed as to direct light longitudinally through the mouth and bottom of a vessel in scanning position and towards said photo-electric device, a screen disposed between the source of light and the photo-electric device, said screen having a number of apertures disposed to be in a line at different radial distances from the centre of the bottom of a vessel in scanning position, the apertures having an area small in relation to that of a vessel bottom and being spaced apart from each other in a radial direction by distances such that irrespective of its position on a vessel bottom, a foreign body of predetermined minimum size in a vessel will obscure a part at least of an aperture and thereby reduce the intensity of light falling on the photo-electric device below a predetermined value, means for locating a vessel in scanning position between the source of light and the photo-electric device, and means for rotating a vessel about its longitudinal axis relatively to said screen.

3. Apparatus according to claim 2, wherein the screen comprises a support for a vessel in scanning position.

4. Apparatus for scanning the bottom of a transparent vessel to detect foreign bodies thereon, comprising in combination a plurality of photo-electric devices, a source of light so disposed as to direct light longitudinally through the mouth and bottom of a vessel in scanning position and towards said photo-electric device, a screen disposed between the source of light and said photo-electric device, said screen having a plurality of apertures, one to each photo-electric device all said apertures being of equal area and disposed in a line at different radial distances from the centre of the bottom of a vessel in scanning position, the apertures having an area small in relation to that of a vessel bottom and being spaced closer together radially at positions remote from said centre, the distance between consecutive apertures being such that, irrespective of the position on a vessel bottom, a foreign body of predetermined minimum size in a vessel will obscure a part at least of an aperture and thereby reduce the intensity of light falling on the photo-electric device associated therewith below a predetermined value, means for locating a vessel in scanning position between the source of light and the photo-electric device, and means for rotating a vessel about its longitudinal axis relatively to said screen.

5. Apparatus according to claim 4, wherein the screen comprises a support for a vessel in scanning position.

6. Apparatus for scanning the bottom of a transparent vessel to detect foreign bodies thereon, comprising in combination a plurality of photo-electric devices, a source of light so disposed as to direct light longitudinally through the mouth and bottom of a vessel in scanning position and towards said photo-electric device, a screen disposed between the source of light and said photo-electric device, said screen having a plurality of apertures, one to each photo-electric device, said apertures being disposed in a line at different radial distances from the centre of the bottom of a vessel in scanning position, the apertures having an area small in relation to that of a vessel bottom and being spaced closer together radially at positions remote from said centre, the distance between consecutive apertures being such that, irrespective of its position on a vessel bottom, a foreign body of predetermined minimum size in a vessel will obscure a part at least of an aperture and thereby reduce the intensity of light falling on the photo-electric device associated therewith below a predetermined value, means for locating a vessel in scanning position between the source of light and the photo-electric device, and means for rotating a vessel about its longitudinal axis relatively to said screen.

7. Apparatus for scanning the bottom of a transparent vessel to detect foreign bodies thereon, comprising in combination a photo-electric device, a source of light so disposed as to direct light longitudinally through the mouth and bottom of a vessel in scanning position and towards said photo-electric device, a rotatable assembly including a support for a vessel to be scanned and means for locating a vessel in scanning position thereon, said support being provided with a number of apertures disposed to be at different radial distances from the centre of said scanning position, the apertures having an area small in relation to that of a vessel bottom and being spaced apart from each other in a radial direction by distances such that, irrespective of its position on a vessel bottom, a foreign body of predetermined minimum size in a vessel will obscure a part at least of an aperture and thereby reduce the intensity of light falling on the photo-electric device below a predetermined value, and means for rotating a vessel about its longitudinal axis relatively to said support.

8. Apparatus according to claim 1, wherein the aperture nearest said centre is of greater area than the aperture remote from the centre.

9. Apparatus according to claim 2, wherein the aperture nearest said centre is of greater area than the aperture remote from the centre.

10. Apparatus according to claim 7, wherein the aperture nearest said centre is of greater area than the aperture remote from the centre.

11. Apparatus according to claim 1, wherein the apertures increase in area from the aperture nearest said centre to the aperture most remote therefrom and the spacing between the apertures decreases radially outwards from said centre.

12. Apparatus according to claim 2, wherein the apertures increase in area from the aperture nearest said centre to the aperture most remote therefrom and the spacing between the apertures decreases radially outwards from said centre.

13. Apparatus according to claim 7, wherein the apertures increase in area from the aperture nearest said centre to the aperture most remote therefrom and the spacing between the apertures decreases radially outwards from said centre.

NORMAN PARKER STOATE.

REFERENCES CITED

The following references are of record in the file of this patent:

UNITED STATES PATENTS

| Number | Name | Date |
|---|---|---|
| 2,100,227 | Stoate, et al. | Nov. 23, 1937 |
| 2,265,037 | Gulliksen | Dec. 2, 1941 |